United States Patent [19]

Wang

[11] Patent Number: 5,379,796
[45] Date of Patent: Jan. 10, 1995

[54] AIR PUMP HEAD CAPABLE OF ENGAGING TIRE AIR VALVE IN TWIST-LOCKING MANNER

[76] Inventor: Lopin Wang, 5F, No. 1, Lane 85 Kwang Fu North Rd., Taipei City, Taiwan, Prov. of China

[21] Appl. No.: 200,726

[22] Filed: Feb. 23, 1994

[51] Int. Cl.⁶ .................... F16K 15/20; F16L 29/02
[52] U.S. Cl. .................... 137/231; 251/149.9
[58] Field of Search ............ 137/223, 231; 251/149.9

[56] References Cited

U.S. PATENT DOCUMENTS

| | | | |
|---|---|---|---|
| 1,266,192 | 5/1918 | Anthony | 137/231 |
| 1,299,398 | 4/1919 | Kahn | 137/231 |
| 1,442,933 | 1/1923 | Firpo | 137/231 |
| 1,510,980 | 10/1924 | Curtiss | 137/231 X |
| 2,237,559 | 4/1941 | Jenne | 137/231 X |
| 3,826,464 | 7/1974 | Berghofer | 251/149.9 |
| 3,926,205 | 12/1975 | Gourlet | 137/231 X |

FOREIGN PATENT DOCUMENTS

| | | | |
|---|---|---|---|
| 2720387 | 11/1978 | Germany | 137/231 |
| 872246 | 7/1961 | United Kingdom | 137/231 |

Primary Examiner—John Rivell
Attorney, Agent, or Firm—Browdy and Neimark

[57] ABSTRACT

An air pump head comprises a housing, a rotating member, a locating member, two leakproof rings, an elastic body, an opening member, a pressing member, and an end jacket. The housing is provided therein with a first receiving space and a second receiving space. The rotating member is disposed in the first receiving space and is fastened at one end thereof with the cylinder of the air pump. The body of the rotating member has a cam section corresponding in location to the second receiving space and further has an air duct in communication with the cam section. Two leakproof elements are attached to both ends of the rotating member to seal off the first receiving space. The elastic body is disposed in the second receiving space for engaging a tire air valve. The opening member and the pressing member are disposed in the second receiving space such that the opening member is connected with the elastic body and that the pressing member and the opening member are lapped together. The end jacket is fastened to the outer end of the second receiving space to ensure that the elastic body, the opening member and the pressing member are held securely in the second receiving space.

5 Claims, 5 Drawing Sheets

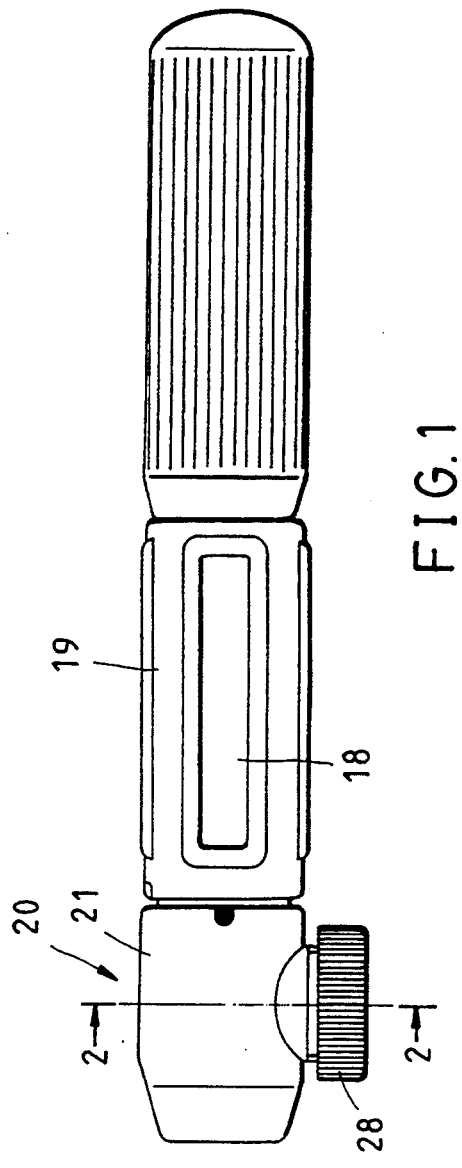
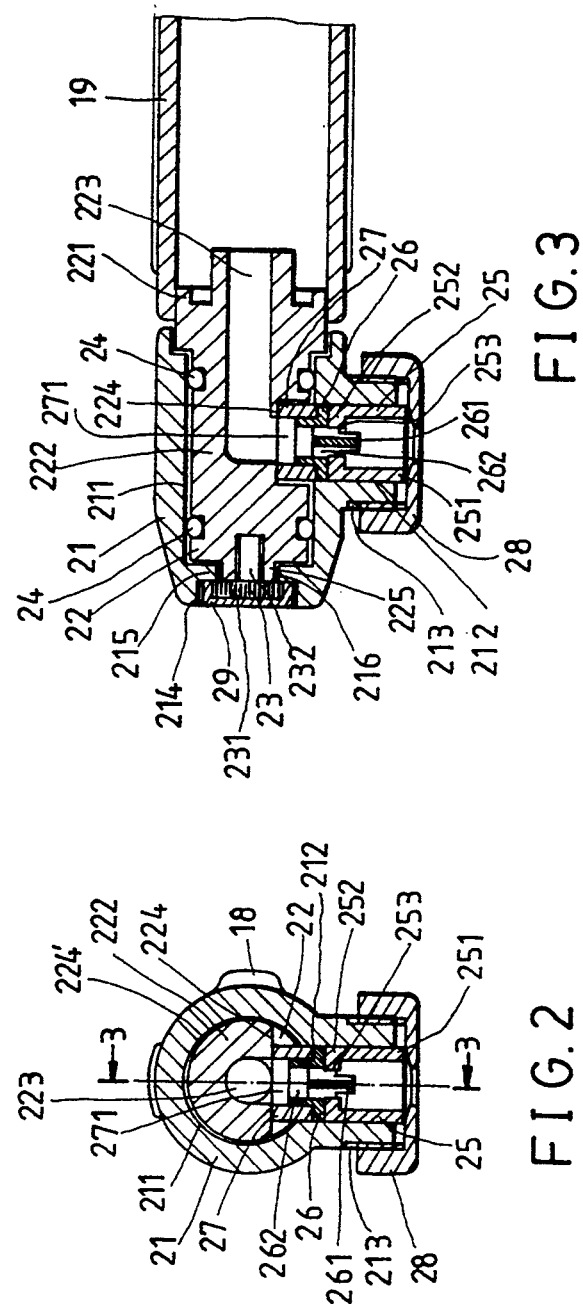

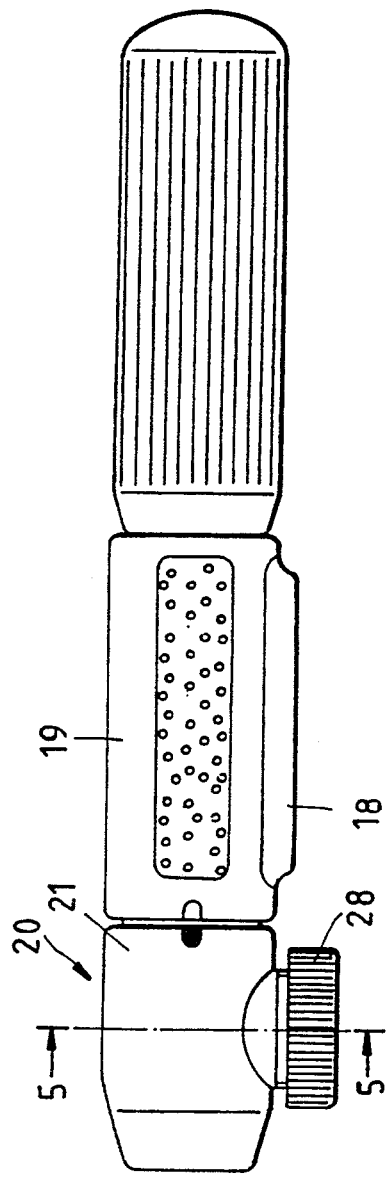
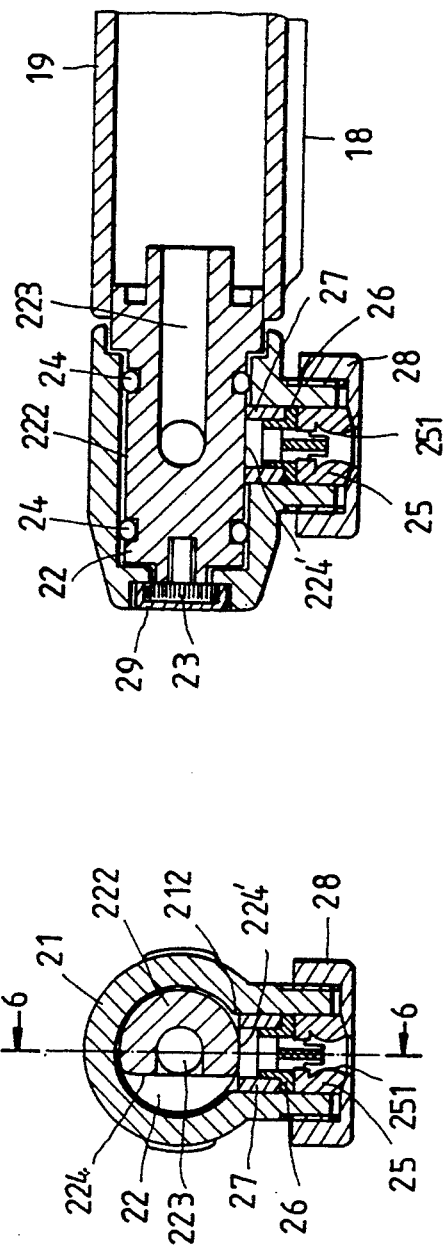

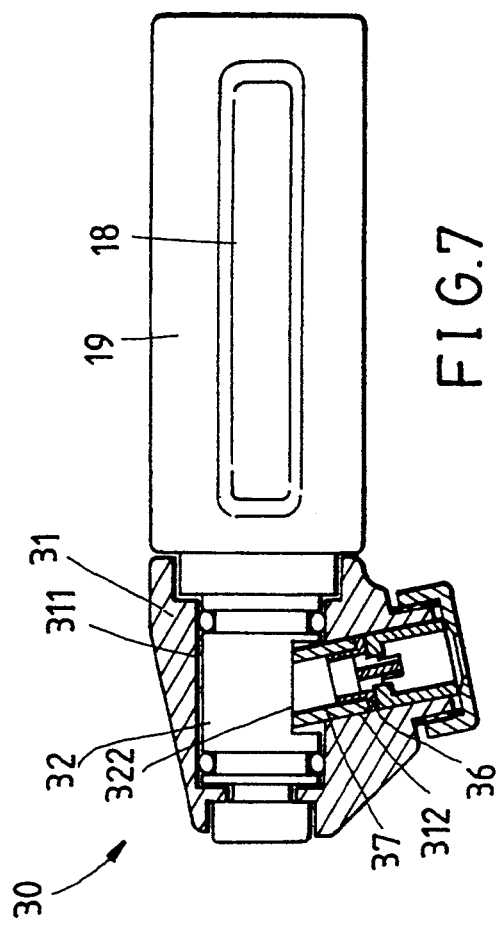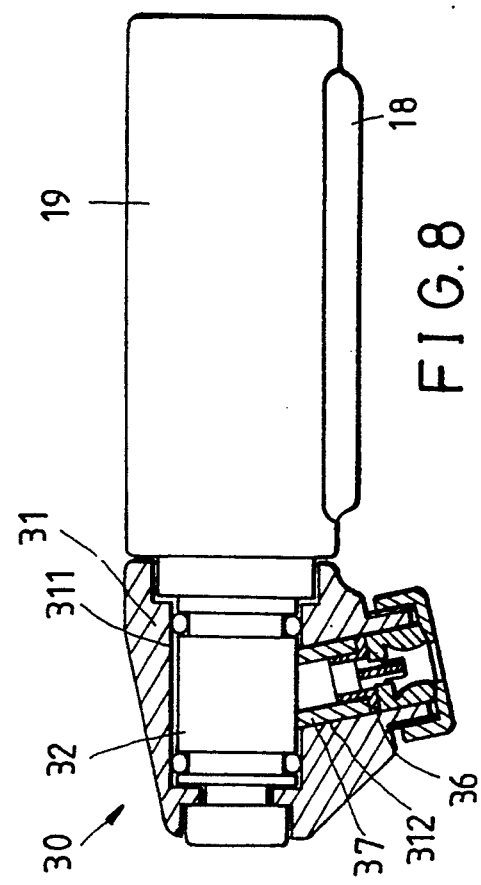

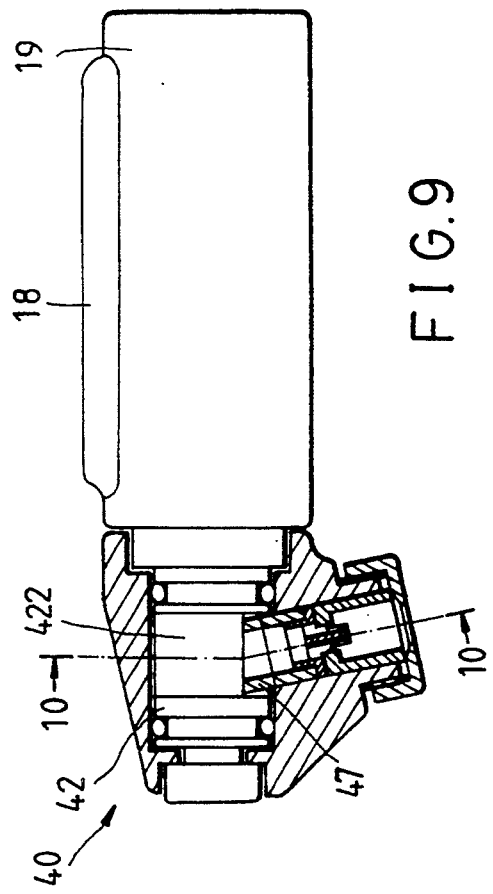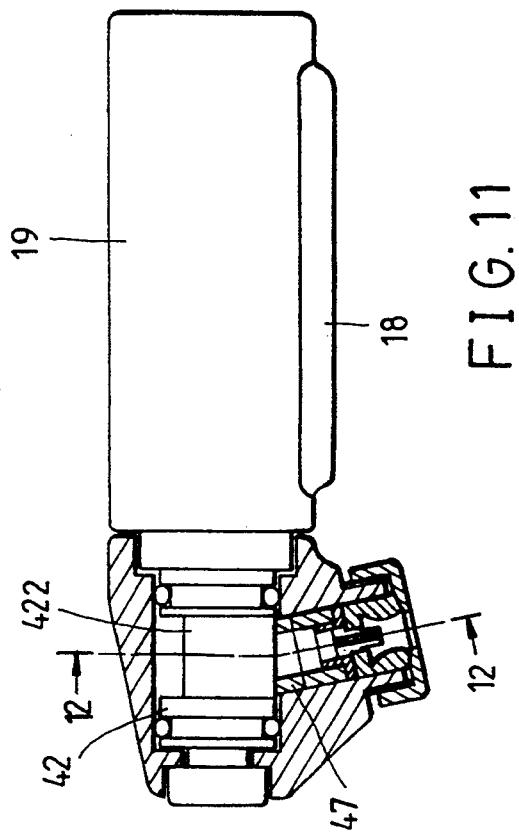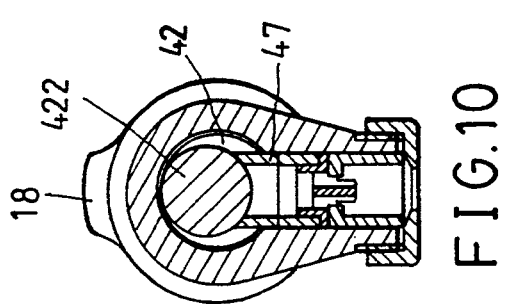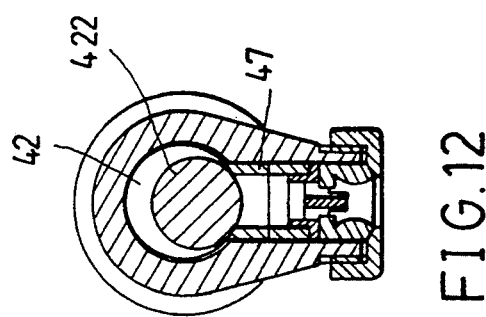
FIG.9
FIG.10
FIG.11
FIG.12

AIR PUMP HEAD CAPABLE OF ENGAGING TIRE AIR VALVE IN TWIST-LOCKING MANNER

FIELD OF THE INVENTION

The present invention relates generally to an air pump, and more particularly to an air pump head capable of engaging a tire air valve in a twist-locking manner.

BACKGROUND OF THE INVENTION

As shown in FIG. 13, a bicycle air pump head of the prior art comprises a cylindrical body 51 having a neck 511 for connecting with a tubular member (not shown in the drawing) and a receiving space 512 of cylindrical construction, a pressing member 52 pivoted to the upper portion of the cylindrical body 51 by a pivoting pin 521 and provided with two pressing surfaces 522 and 523. The vertical distance S1 between the pressing surface 522 and the pivoting pin 521 is smaller than the vertical distance S2 between the pressing surface 523 and the pivoting pin 521. The air pump head further comprises a support member 53, a leakproof ring 54, an urging member 55, an elastic body 56, and an end jacket 57. The support member 53 is received in the receiving space 512 and under the pressing member 52 and provided in the lower side thereof with a cut 531. The leakproof ring 54 is fitted over the support member 53 for preventing the air from leaking from the upper portion of the cylindrical body 51. The urging member 55 is disposed under the support member 53 and provided with a through hole 551 in communication with the neck 511 and with a protruded column 552 for use in moving away the closing valve (not shown in the drawing) of the tire air valve. The elastic body 56 is disposed under the urging member 55. The end jacket 57 is fastened to the bottom of the cylindrical body 51 for locking the support member 53, the urging member 55 and the elastic body 56 in the receiving space 512 of the cylindrical body 51. In operation, the center slot 561 of the elastic body 56 is caused to engage a tire air valve before the pressing member 52 is moved upwards, as shown in FIG. 14, with the pressing surface 523 exerting a pressure on the support member 53. As a result, the distance S2 between the pressing surface 523 and the pivoting pin 521 becomes longer, thereby resulting in the support member 53 to cause the urging member 55 to move downwards a distance equal to S2−S1, so as to exert a pressure on the elastic body 56. As the elastic body 56 is caused to deform, the inner diameter of the center slot 561 becomes narrower. The center slot 561 of the elastic body 56 is therefore caused to hold securely the tire air valve to facilitate the air pumping.

As described above, the pressing member 52 must be pressed and turned to cause the elastic body 56 to engage the tire air valve. Such an action can hamper the pumping action. In addition, the end jacket 57 is often provided with a dust-protecting cover. However, the dust can be still caused to enter the pump head through the lower portion of the pressing member 52.

SUMMARY OF THE INVENTION

It is therefore the primary objective of the present invention to provide an air pump with means capable of engaging a tire air valve torsionally.

It is another objective of the present invention to provide an air pump which is dust-proof.

The foregoing objectives of the present invention are attained by an air pump head, which comprises a housing, a rotating member, a locating member, two leakproof rings, an elastic body, an opening member, a pressing member, an end jacket, and a dust-proof jacket. The housing is provided therein with a first receiving space and a second receiving space. The rotating member is received in the first receiving space such that one end of the rotating member is fastened with the cylinder of the air pump. The body of the rotating member has a cam section corresponding in location to the second receiving space and further has centrally an air duct in communication with the cam section and the fastening end of the rotating member. Two leakproof elements are attached to both ends of the rotating member so as to seal off the first receiving space. The elastic body is disposed in the second receiving space for engaging a tire air valve. The opening member and the pressing member are disposed in the second receiving space such that the opening member is connected with the elastic body and that the pressing member and the opening member are lapped together. The end jacket is attached to the outer end of the second receiving space to ensure that the elastic body, the opening member and the pressing member are held securely in the second receiving space.

BRIEF DESCRIPTION OF THE DRAWINGS

FIG. 1 is a front elevational view of a first preferred embodiment of the present invention, which is not caused to engage a tire air valve.

FIG. 2 is a sectional view of a portion taken along the line 2—2 as shown in FIG. 1.

FIG. 3 is a sectional view of a portion taken along the line 3—3 as shown in FIG. 2.

FIG. 4 is similar to FIG. 1, except that the first preferred embodiment has been rotated an angle of 90 degrees to be in an engaging state.

FIG. 5 is a sectional view of a portion taken along the line 5—5 as shown in FIG. 4.

FIG. 6 is a sectional view of a portion taken along the line 6—6 as shown in FIG. 5.

FIG. 7 is a schematic view of a second preferred embodiment of the present invention, which is not in an engaging state.

FIG. 8 is similar to FIG. 7, except that the second preferred embodiment of the present invention is in an engaging state.

FIG. 9 is a schematic view of a third preferred embodiment of the present invention, which is not in an engaging state.

FIG. 10 is sectional view of a portion taken along the line 10—10 as shown in FIG. 9.

FIG. 11 is similar to FIG. 9, except that the third preferred embodiment is in an engaging state.

FIG. 12 is a sectional view taken along the line 12—12 as shown in FIG, 11.

DETAILED DESCRIPTION OF THE INVENTION

Figure 13:
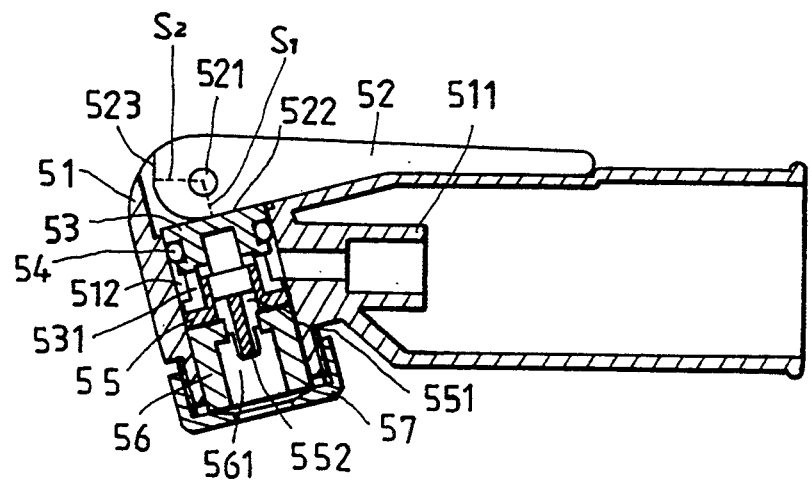
FIG. 13 is a schematic view of an air pump head of the prior art, which is not in an engaging state.
Figure 14:
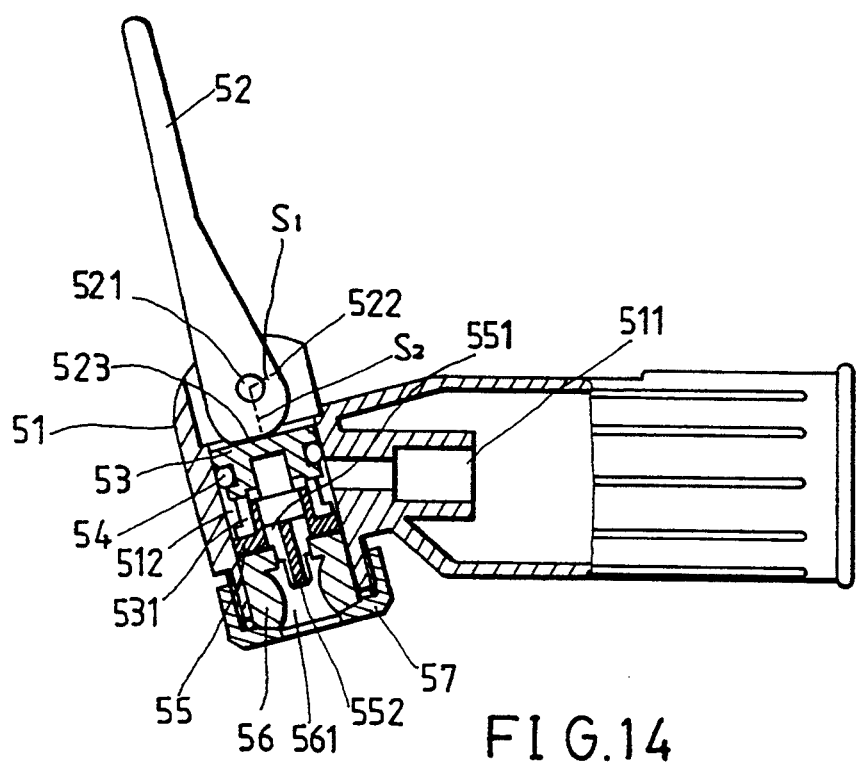
FIG. 14 is similar to FIG. 13, except that the air pump head is in an engaging state.

Referring to FIGS. 1-3, an air pump head 20 of the present invention is shown to comprise the component parts described hereinafter.

A housing 21 is provided therein centrally with a first receiving space 211 of columnar shape. There is a second receiving space 212 of columnar shape and located in such a manner that the second receiving space 212 is perpendicular to the central axial line of the first receiving space 211. The first and the second receiving spaces 211 and 212 are in communication with each other. The second receiving space 212 is provided in the outer wall of the open end thereof with a male screw portion 213. The housing 21 is provided in one end thereof with a recess 214 having an end wall 215 provided centrally with a through hole 216 in communication with the first receiving space 211.

A rotating member 22 of a cylindrical shape is disposed in the first receiving space 211 and has one end 221 extending to the outside of the housing 21 to couple with the cylindrical body 19 of the air pump in such a manner that the end 221 can rotate with the cylindrical body 19. The rotating member 22 is provided with a cam section 222 corresponding in location to the second receiving space 212. The rotating member 22 is further provided therein with an air duct 223 having one end that is connected with the connecting end 221 of the cylindrical body 19 and having another end that is connected with the end surface 224 of the cam section 222.

A locating member 23 has a head portion 231 having a threaded rod 232 extending from the center of one side thereof. The locating member 23 is fastened with another end 225 of the rotating member 22 by the threaded rod 232. The head portion 231 is disposed in the recess 214 such that the head portion 231 is retained by the end wall 215 of the recess 1214 so as to retain securely the rotating member 22 in the housing 21.

Two leakproof rings 24 are disposed respectively in the outer sides of both ends of the rotating member 22 and are received in the first receiving space 211. These two leakproof rings 24 are located respectively in both sides of the second receiving space 212 to seal off the first receiving space 211.

An elastic body 25 is disposed in the second receiving space 212 and provided with a tubular body 251 having an open end and another end provided with an end wall 252 which in turn is provided centrally with a round hole 253.

An opening member 26 is disposed in the second receiving space 212 and provided with a protruded column 261 adjacent to one end of the elastic body 25 for pushing to open the closing valve (not shown in the drawing) of the tire air valve. The opening member 26 is provided with a predetermined number of through holes 262 for keeping the air in the second receiving space 212 to flow freely.

A pressing member 27 is disposed in the second receiving space 212 and has one end adjacent to the opening member 26 and another end that is lapped with the cam section 222 of the rotating member 22. The pressing member 27 is provided with a predetermined number of through holes 271 for keeping the air in the second receiving space 212 to flow freely.

A pressing member 27 is disposed in the second receiving space 212 and has one end adjacent to the opening member 26 and another end that is lapped with the cam section 222 of the rotating member 22. The pressing member 27 is provide with a predetermined number of through holes 271 for keeping the air in the second receiving space 212 to flow freely.

An end jacket 28 of a ring-shaped construction is provided therein with female threads engageable with the threaded portion 213 of the housing 21 for preventing the elastic body 25, the opening member 26 and the pressing member 27 from slipping out of the second receiving space 212.

A dustproof jacket 29 is fitted over the locating member 23 and disposed in the recess 214 of the housing for preventing the dust from entering the housing 21.

As shown in FIGS. 4, 5 and 6, the cylindrical body 19 is turned for a 90-degree angle to cause the lapping position of the pressing member 27 and the rotating member 22 to move from the end surface 224 of the cam section 222 to an arcuate surface 224', thereby causing the cam section 222 to exert a pressure on the pressing member 27, which is then caused to move a predetermined distance along the axis of the second receiving space 212 toward the elastic body 25. As a result, the elastic body 25 is forced to deform so as to cause the inner diameter of the tubular body 251 of the elastic body 25 to become smaller to enable the elastic body 25 to engage securely the air valve of a tire.

As shown in FIGS. 7 and 8, the second embodiment of the present invention is similar in construction to the first preferred embodiment described above, with the difference being that the former has a housing 31 provided with a first receiving space 311 and a second receiving space 312 having a center line forming a predetermined bevel angle with a center line of the first receiving space 311. The angle referred to above is about 12 degrees. Therefore, the pressing member 37 of the second preferred embodiment is wedge-shaped so as to enable one end of the pressing member 37 to lap with the opening member 36 and to enable another end of the pressing member 37 to lap with the cam section 322 of the rotating member 32. As a result, the pressing member 37 is enabled to move along the axis of the second receiving space 312 at the time when the rotating member 32 is twisted to turn, as illustrated in FIG. 8. The pump head 30 of the second preferred embodiment described above has an angle of inclination to facilitate the pumping operation.

It must be noted here that the rotation angle of the rotating member of the present invention may be other than 90 degrees, either greater or smaller than 90 degrees, and that the shape of the cam section of the present invention may be embodied in other specific forms.

As shown in FIGS. 9–12, the third preferred embodiment of the present invention is similar in construction to the second preferred embodiment, with the difference being that the former has a rotating member 42 provided with a columnar cam section 422 of a smaller outer diameter and that the cam section 422 is disposed eccentrically. The pressing member 47 has an arcuate end that is lapped with the cam section 422. The pressing member 47 may be made up of two elements which are of a ring-shaped or wedge-shaped and which may be made integrally. The rotation angle of the rotating member 42 of the third preferred embodiment described above is 180 degrees.

The present invention may be provided with a cover that is fitted over the end jacket to seal off the open end of the end jacket. The cylindrical body 19 of the present invention is provided with a pressure device 18. There is an indicator marked on a place located between the housing and the cylindrical body to display the engaging position of the air pump head.

What is claimed is:

1. An air pump head capable of engaging a tire air valve in a twist-locking manner comprising:

a housing provided centrally with a first receiving space of columnar construction and a second receiving space of columnar construction and having an axial line forming a predetermined angle of inclination with an axial line of said first receiving space, said first receiving space being greater in size than said second receiving space and in communication with said second receiving space;

a rotating member disposed in said first receiving space such that one end of said rotating member is connected with a cylindrical body of an air pump and is capable of rotating along with said cylindrical body, said rotating member provided with a cam section corresponding in location to said second receiving space, said rotating member further provided therein with an air duct having one end that is connected with a connection end of said cylindrical body of said air pump, said air duct further having another end that is connected with a surface of said cam section;

at least two leakproof elements attached respectively to both ends of said rotating member for sealing off said first receiving space;

an elastic body disposed in said second receiving space and having a tubular body with an open end and with another end that is provided with an end wall having centrally a round hole;

an opening member disposed in said second receiving space and having one end that is provided with a protruded column adjacent to said elastic body for pushing to open a closing valve of an air valve of a tire, said opening member further having a body provided with a predetermined number of through holes for keeping air in said second receiving space to flow freely;

a pressing member disposed in said second receiving space and having one end adjacent to said opening member and having another end that is lapped with said cam section of said rotating member, said pressing member further having a body that is provided with a predetermined number of through holes for keeping air in said second receiving space to flow freely, said pressing member capable of being actuated by a rotation of said cam section of said rotating member to move a distance along an axis of said second receiving space toward said elastic body to exert a pressure on said elastic body, which is then caused to deform such that an inner diameter of said tubular body of said elastic body becomes smaller to enable said elastic body to engage securely said air valve of said tire; and an end jacket attached to an open end of said second receiving space for preventing said elastic body, said opening member and said pressing member from slipping out of said second receiving space.

2. The air pump head of claim 1 wherein said second receiving space is normal to a center line of said first receiving space.

3. The air pump head of claim 1 wherein said second receiving space forms an acute angle with a center line of said first receiving space; and wherein said pressing member is wedge-shaped and has a flat end adjacent to said opening member and a slanted end that is lapped with said cam section of said rotating member.

4. The air pump head of claim 1 wherein said housing is provided with a through hole and a locating member, said through hole being corresponding in location to another end of said rotating member, said locating member having a head portion provided with a rod portion which is fastened with said another end of said rotating member via said through hole of said housing so as to hold said rotating member securely in said housing.

5. The air pump head of claim 4 wherein said locating member is provided with a dustproof jacket fitted thereover.

* * * * *